United States Patent [19]
Benker

[11] 3,782,842
[45] Jan. 1, 1974

[54] ADJUSTABLE SELF-LOCKING CLAMP FOR WIRES, PIPES AND OTHER STRUCTURAL SHAPES

[75] Inventor: Horst Wilhelm Benker, Heilbronn, Germany

[73] Assignee: Bunker Ramo Corporation, Oak Brook, Ill.

[22] Filed: July 28, 1971

[21] Appl. No.: 166,790

[52] U.S. Cl............................403/374, 403/320
[51] Int. Cl................................................. F16b 9/00
[58] Field of Search........................ 287/116, 20 R; 339/268 S, 268 R, 270 R; 285/348, 356, 343, 382.7; 24/126 C, 136 B, 126 R; 279/1 F, 59, 60

[56] References Cited
UNITED STATES PATENTS

| 2,682,413 | 6/1954 | Tripp | 279/56 |
| 3,236,534 | 2/1966 | Tripp | 279/59 |
| 1,367,589 | 2/1921 | Crossley | 279/1 F |
| 2,130,825 | 9/1938 | Bergan | 24/136 R |
| 2,506,096 | 5/1950 | Marshall | 285/266 |
| 3,180,664 | 4/1955 | Franck | 285/382.7 |

Primary Examiner—Andrew V. Kundrat
Attorney—Frederick M. Arbuckle

[57] ABSTRACT

A cable clamp capable of firmly gripping the exterior surfaces of an electrical cable, pipe, conduit or other shape by an adjustable compressive force while simultaneously effecting an airtight seal between the cable and the housing in which the clamping mechanism is mounted.

6 Claims, 6 Drawing Figures

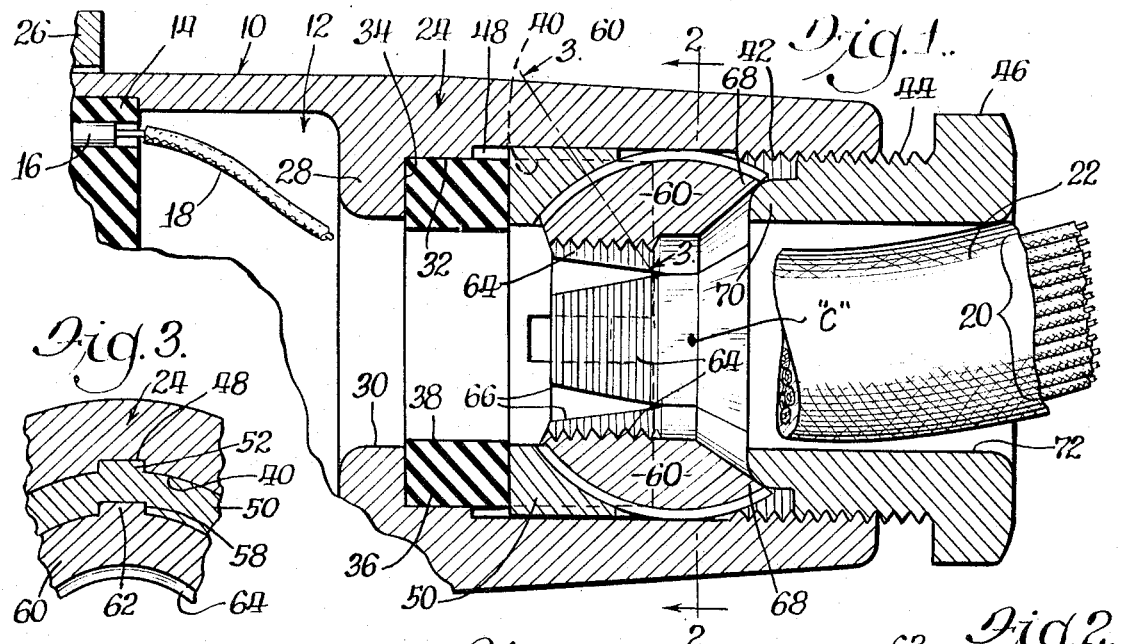
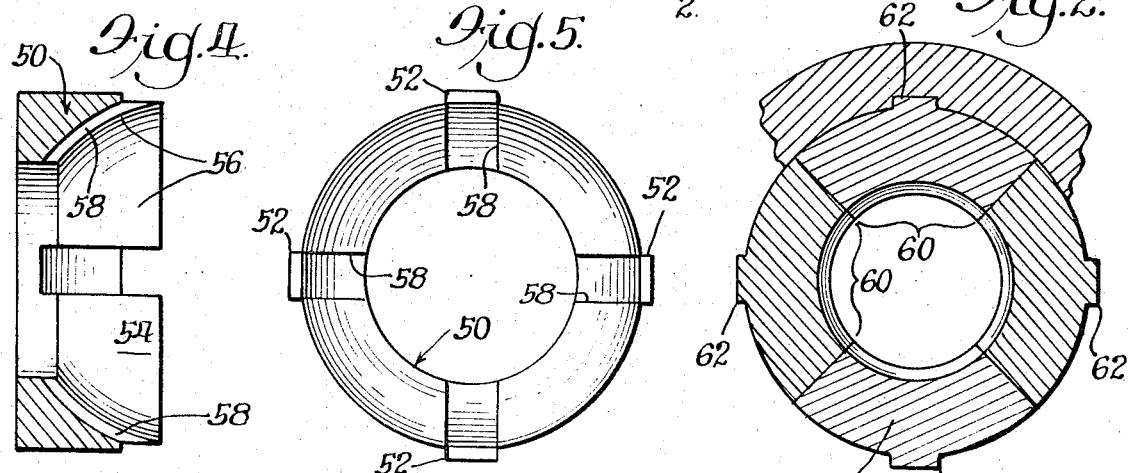
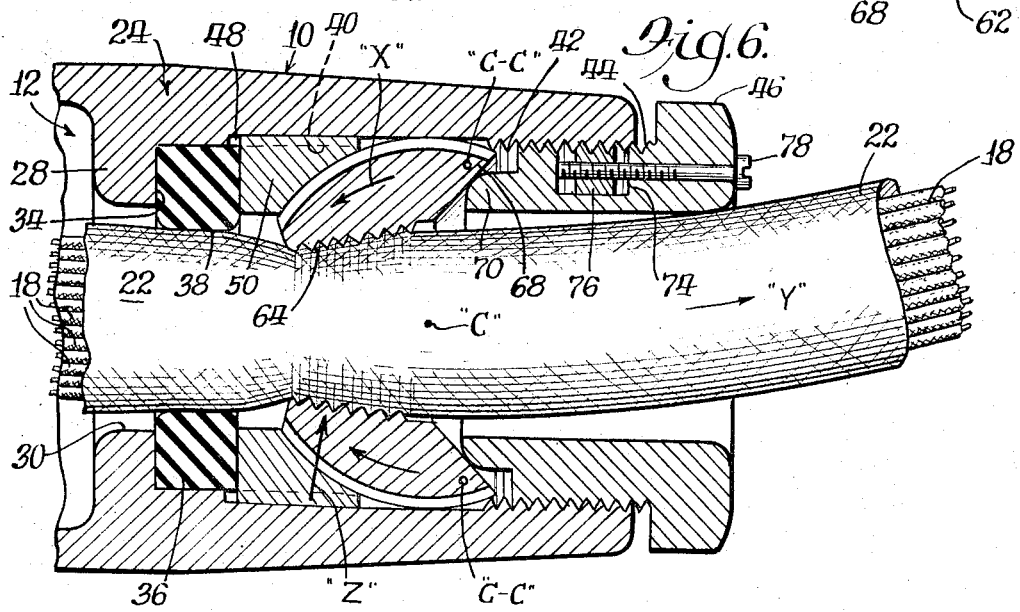

ADJUSTABLE SELF-LOCKING CLAMP FOR WIRES, PIPES AND OTHER STRUCTURAL SHAPES

BACKGROUND OF THE INVENTION

While many and varied types of clamps and seals have been utilized over the years to secure cable conduits or the like to a housing, for example, the commonly-known types leave much to be desired, particularly in that they often do not adapt themselves well to utilization of cables or conduits of different sizes or to those having any appreciable dimensional variations. Also, they are often subject to the fault that they tend to release the clamped member if subjected to any substantial longitudinal pulling force exerted thereon. In addition, the prior devices have, in many cases, been prohibitively expensive because their inherent design is such as to require unnecessarily difficult machining operations and demand adherence to extremely close dimensional tolerances; often too small to be commercially acceptable in many instances encountered in the trade.

OBJECTS

It is therefore the general aim of the invention to provide a self-sealing clamping assembly that overcomes the aforementioned deficiences of prior types. To this end it is among particular objects of the present invention A. To provide a cable clamp having a chuck composed of plural, separate jaws arranged to forcefully close upon the exterior surfaces of the cable; wherein the separate jaw segments are rigid and unflexing in themselves and are moved in against the cable by shifting the parts bodily rather than by any type of flexing or spring action as has been common in the art;

B. To provide interlocking devices (illustrated as keyways and splines) to prevent rotational movement of the chuck segments within their housing, and to thus successfully resist any twisting forces that may be exerted thereon by the cable;

C. To be self-tightening if subjected to undue physical strain; and

D. To provide a resilient peripheral seal around the cable closely adjacent the chuck, with a single dual-function tightening device to tighten the chuck and to simultaneously engage and compress the seal about the cable surfaces.

While the principles of the present invention are applicable to all kinds of strain relief joints, whether in the electrical mechanical, or construction fields, it is illustrated in the present disclosure as applied to an electrical connector having a metallic outer shell having an internal wiring cavity with a plurality of conductive contacts mounted in conventional arrangement in an insulating insert therein, with a resilient seal surrounding a multi-conductor cable at its point of entrance into the cavity, and a clamping arrangement including a segmental chuck and screw threaded means to tighten both the seal and the chuck about the sheath of the entrance cable, as is more fully described in connection with the drawings of the present disclosure wherein:

FIG. 1 is a longitudinal sectional view of a self-locking clamp assembly according to the invention, shown as mounted within an electrical connector to seal and grip the exterior sheath of a multi-conductor electrical cable and thus act as a strain relief member protecting the individual internal conductors thereof. As illustrated, the cable is shown broken away to more clearly illustrate the operative mechanism of the clamp and seal.

FIG. 2 is a transverse cross-sectional view of the connector illustrated in FIG. 1, the view being taken on the plane of the line 2—2 of FIG. 1 to illustrate the relationship of the several shiftable segments of the adjustable chuck.

FIG. 3 is a detail sectional view taken substantially on the plane of the line 3—3 of FIG. 1, showing the manner in which twisting or relative rotational movement of the cable or chuck jaws housed inside of the connector shell is avoided by splines on the jaws of the chuck, the splines being slidable in curvilinear paths shiftable along keyways in both the thrust bearing and connector shell, as will be later described.

FIG. 4 is a central sectional view taken on the axis of a thrust bearing having the dual function of guiding the individual jaw segments of the chuck and simultaneously compressing the resilient seal of the assembly about the cable sheath.

FIG. 5 is an elevational view of the thrust bearing illustrated in FIG. 4 as viewed from the right hand side of that figure.

FIG. 6 is a central longitudinal sectional view of the assembly illustrated in FIG. 1 showing the several parts in positions they assume as the clamping mechanism is tightened, to simultaneously A. grip the outer sheath of the cable and thus act as a strain relief on the individual conductors thereof;

B. lock the cable and the structural parts of the clamp against twisting forces; and C. position the chuck segments of the clamp so that outward strain on the cable tends to tighten the grip of the chuck thereon; and D. exert an airtight and watertight compressive seal around the cable itself, at its point of entry into the wiring cavity of the connector.

Referring now to FIG. 1 of the drawings, the invention is shown in connection with a multi-conductor electrical connector. In such connectors it is conventional to provide a metallic shell 10 having an internal wiring cavity 12 with a dielectric insert 14 in which any desired number of conductive contacts 16 may be mounted. The individual contacts 16 are usually soldered, welded or crimped to the bared ends of individual insulated wire leads 18, with the leads from all of the contacts brought together in a cable generally designated 20, usually enclosed within a tubular conduit or sheath 22. The sheath 22 may be of metal but is often tough vinyl or other plastic for reasons of flexibility.

The cable 20 enters the cavity 12 of the connector shell through a central duct in a hollow sleeve 24 formed integrally with the shell 10. Also, since conventional connectors are usually arranged to interengage with and be coupled to similar mating connectors, a bayonet lock or coupling sleeve 26 is often provided for holding the connector shells together.

The duct within the tubular sleeve 24 is illustrated as having an internal inwardly extending flange or shoulder 28 with a central aperture 30 through which the cable 20–22 enters the cavity 12. Immediately adjacent the shoulder 28 but opposite the cavity 12 the central duct is counterbored to a diameter indicated at 32, thus forming an internal transverse shoulder 34. A relatively soft, resilient, insulating sealing ring 36 is seated in the bore 32 against the shoulder with its central aperture 38 closely encircling the cable sheath 22.

The inner surfaces of the sleeve portion 24 of the connector shell are bored to cylindrical shape and at least the outermost portion of the bore 40 has internal screw-threads 42 to receive mating male threads 44 of a threaded adjusting and tightening screw 46. Also, the internal walls of the bore 40 (which are essentially cylindrical in contour) are provided with a plurality of longitudinally extending keyways 48, there being four such keyways in the embodiment of the invention here illustrated.

A generally ring-shaped thrust bearing 50 (FIGS. 4 & 5) is mounted within the bore 40 in position to bear against the surface of the sealing ring 36 opposite the shoulder 34.

This thrust bearing 50, which is of generally cylindrical shape on its exterior surfaces, is provided with keys 52 slidable within their respective keyways 48 so that any relative rotation between the thrust bearing and the connector shell is impossible. The thrust bearing is, however, also provided with a socket portion 54, the internal surfaces 56 of which define a section of a sphere having its geometric center on the longitudinal axis of the bore 40 and located at approximately the position designated by the reference character "C" of FIG. 1. In addition, the interior surfaces 56 of the sockets are provided with plural keyways 58, each of approximately the same width and depth as the keyways 48 in the bore 40 of the socket sleeve 24, so that when the thrust bearing 50 is inserted in the assembly from the rearward end of the sleeve 24, the engagement between the bearing keys 52 and the shell keyways 48 is such as to permit longitudinal sliding motion of the thrust bearing with respect to the connector shell but preclude any relative angular shifting of these parts so that the internal keyways 58 of the thrust bearing each lie in registry and alignment with a corresponding keyway 48 in the connector shell.

The chuck of the assembly consists of cluster of separate segments or jaws 60, each of solid metal form with their exterior surfaces shaped to define sections of a sphere, except that they each have an external spline 62, so that the cluster of the chuck segments 60 may be nested within the socket portion 54 of the thrust bearing 50 with the forwardmost portions of each of the splines 62 slidably fitted within the keyways 58 of the thrust bearing 50, while the more rearward portions of each of these splines is received within the corresponding keyway 48 of the shell, for sliding motion therein.

The individual jaws of segments 60 of the chuck assembly are provided with an internal knurl or teeth 64 and the adjoining sidewall surfaces of each of the jaws 60 are cut away or tapered outwardly as indicated at 66 so that as the chuck clamps the cable sheath extending therethrough, the individual jaws may swing inwardly to press the teeth 64 forcefully into the exterior surfaces of the cable sheath 22.

The rearward ends of each of the chuck segments 60 have an integral extension or bearing 68 forming a continuation of the spline 62 and having an inclined surface engaging the rounded, forward end of a sleeve-like pilot 70 formed as an integral part of the adjusting screw 46 and surrounding the bore 72 thereof through which the cable 20–22 enters the connector.

With this arrangement, it will be clearly apparent that as the adjusting screw 46 is threaded inwardly into the sleeve 24 of the connector shell, the pilot 70 thereof will engage the inner inclined surfaces 68 of each of the several chuck segment extensions 68 and will thus force the several chuck segments bodily to the left, as viewed in the drawings. As this occurs, the engagement between the convex spherical forward surfaces of each of the chuck segments 60 and the corresponding concave spherical surfaces 56 of the thrust bearing socket 54 will cause the individual chuck segments 60 to move in a curvilinear path, somewhat as indicated by the arrow "X" in FIG. 6 until the chuck jaws bite into the cable sheath 22 to a degree generally proportionate to the amount of tightening of the screw 46.

Since the chuck segments do not flex in their operation, they may be of more than adequate rigidity and strength and the propensity of spring breakage so often encountered in prior art devices may be avoided.

While the above-described action adequately clamps the cable within the connector shell, the inward movement of the tightening screw 46 will also force the chuck segments 60 against the circular thrust bearing 50 and to compress the sealing gasket 36, causing it to bulge inwardly (FIG. 6) and tighten itself about the cable sheath. This effects an airtight and watertight seal between the cable sheath and the connector shell at the point of entry of the cable into the wiring cavity 12.

The thrust bearing 50 is prevented from any rotation or angular within the sleeve 24 of the connector shell by the interengagement of the keys 52 of the thrust bearing in the keyways 48 of the shell 40. Additionally, the curved external splines 62 of the individual chuck jaw members 60 are positioned with the leading portion of each of the splines in engagement with the internal arcuate keyways of 58 of the thrust bearing 50 while the more rearward portions of these same splines ride in the keyways 48 of the shell, thus all of the functional parts of the clutch assembly are at all times keyed to each other so that while they function to engage or disengage the cable sheath by inward clamping action, they successfully resist any tendency of the cable or other parts to twist or turn.

When the chuck and seal have thus been tightened to the desired degree, any accidental release or loosening of the parts may be precluded by the operation of the locking device best shown in FIG. 6, wherein the threaded portion 44 of the adjusting screw 46 has a recess 74 to receive a shiftable slug 76 having its outer surface threaded to match the internal threads 42 of the connector shell but loosely received in the recess of the adjusting screw so that it may be drawn to the right, as viewed in the drawings, by tightening the locking screw 78. This causes the interengaging threads between the slug 76 and the threads 42 of the shell to bind against each other and prevent either loosening or tightening of the adjusting screw 46 until the locking screw 78 is first loosened.

As thus far described, it will be apparent that the present invention accomplishes efficient clamping and sealing, but it should also be recognized that (in addition to the desirability of the above-described functions) the mechanism is such that it responds to violent outward forces exerted on the cable in the direction "Y" (FIG. 6) to further tighten the chuck jaws on the cable surfaces. This is because, when the parts are in clamped position, any outward force on the cable will tend to move the chuck segments to the right by virtue of the interengagement of the chuck teeth with the cable sheath. At such time, since bodily movement of the chuck segments in that direction is precluded by engagement of the rearward pointed extensions 68 of the chuck jaws, they will establish pivot points spaced laterally from the axis of the cable and in the general area of the points "c—c" so that any outward force or motion will be resolved into a rocking action, tending to swing teeth 64 at the left ends of the chuck segments inwardly against the cable, as indicated by the arrow "Z."

I claim:

1. In a clamping device for anchoring cables and the like to other structural parts, the combination of:
   a. a hollow sleeve-like member having a central duct for accepting a cable to be clamped;
   b. a chuck comprising a plurality of separate segments mounted within said duct for shifting movement therein in directions to and fro along the longitudinal axis of said duct, the separate chuck segments being of rigid construction and including integral jaws with each segment being mounted adjacent the inner wall of the duct for rocking movement with respect to said wall to permit inward movement of said jaws toward the periphery of a cable inserted into said duct, whereby said jaws may converge on said cable when said segments are rocked;
   c. adjusting and tightening means acting between said member and said chuck segments for axially shifting and rocking said chuck segments to move the jaws inwardly against the cable to cooperatively grip the periphery thereof;
   d. means acting between said member and said chuck segments for restraining rotational movement of said segments relative to said wall when the cable is rotationally twisted relative to said member;
   e. guide means including a socket receiving at least a portion of each chuck segment and having converging walls to direct the motion of the chuck segments toward each other, said socket being a part of a shiftable thrust bearing positioned within said duct, and
   f. a peripheral sealing gasket encircling the cable and compressible by axial movement of the thrust bearing to establish a tight seal around the cable sheath.

2. A cable-clamping device according to claim 1 wherein the socket of the thrust bearing is concave with walls of generally spherical shape, whereby the clutch segments are moved in arcuate paths of motion about a single center coaxial with the center of the cable.

3. A cable-clamping device according to claim 2 wherein the adjusting and tightening means engages each of the chuck segments in a location spaced substantially away from the exterior surfaces of the cable, whereby any excessive pulling force applied to the cable in a direction to withdraw it from the clamp is resolved into opposed resultant forces tending to rock the individual chuck segments and swing the jaws thereof inwardly to achieve a self-tightening effect of the jaws on the cable.

4. A cable-clamping device according to claim 1 wherein said means for restraining rotational movement comprises cooperating splines and keyways carried by said chuck segments, said wall and said thrust bearing as well as cooperating splines and keyways carried by said thrust bearing and said wall.

5. In a clamping device for anchoring cables and the like to other structural parts, the combination of:
   a. a hollow sleeve-like member having a central duct for accepting a cable to be clamped;
   b. a chuck comprising a plurality of separate segments mounted within said duct for shifting movement therein in directions to and fro along the longitudinal axis of said duct, the separate chuck segments being of rigid construction and including integral jaws with each segment being mounted adjacent the inner wall of the duct for rocking movement with respect to said wall to permit inward movement of said jaws toward the periphery of a cable inserted into said duct, whereby said jaws may converge on said cable when said segments are rocked;
   c. adjusting and tightening means acting between said member and said chuck segments for axially shifting and rocking said chuck segments to move the jaws inwardly against the cable to cooperatively grip the periphery thereof;
   d. means acting between said member and said chuck segments for restraining rotational movement of said segments relative to said wall when the cable is rotationally twisted relative to said member;
   e. guide means including a socket receiving at least a portion of each chuck segment and having converging walls shaped as portions of a sphere, whereby the clutch segments are directed in arcuate paths of motion about a single center on the center line of the cable.

6. In a clamping device for anchoring cables and the like to other structural parts, the combination of:
   a. a hollow sleeve-like member having a central duct for accepting a cable to be clamped;
   b. a chuck comprising a plurality of separate segments mounted within said duct for shifting movement therein in directions to and fro along the longitudinal axis of said duct, the separate chuck segments being of rigid construction and including integral jaws on their internal surfaces, and having external surfaces shaped as portions of a sphere, with each segment being mounted adjacent the inner wall of the duct for rocking movement with respect to said wall to permit inward movement of said jaws toward the periphery of a cable inserted into said duct, whereby said jaws may converge on said cable when said segments are rocked;
   c. adjusting and tightening means acting between said member and said chuck segments for axially shifting and rocking said chuck segments to move the jaws inwardly against the cable to cooperatively grip the periphery thereof;
   d. means acting between said member and said chuck segments for restraining rotational movement of said segments relative to said wall when the cable is rotationally twisted relative to said member;
   e. guide means including a socket receiving at least a portion of each chuck segment and having converging walls sloped as portions of a sphere, whereby the clutch segments are directed in arcuate paths of motion about a single center on the center line of the cable.

* * * * *